United States Patent
Zauche et al.

(10) Patent No.: US 7,726,069 B1
(45) Date of Patent: Jun. 1, 2010

(54) HORTICULTURE GROWING MEDIA

(76) Inventors: Timothy H. Zauche, 6737 N. Elm St., Platteville, WI (US) 53818; Michael E. Compton, 8547 Sand Hill Rd., Platteville, WI (US) 53818

( * ) Notice: Subject to any disclaimer, the term of this patent is extended or adjusted under 35 U.S.C. 154(b) by 884 days.

(21) Appl. No.: 11/509,536

(22) Filed: Aug. 24, 2006

Related U.S. Application Data

(60) Provisional application No. 60/711,725, filed on Aug. 26, 2005.

(51) Int. Cl.
C09K 17/14 (2006.01)
A01G 9/10 (2006.01)

(52) U.S. Cl. .............................. 47/58.1 SC; 47/DIG. 10

(58) Field of Classification Search .................. 47/59 S, 47/DIG. 10, 58.1 R, 58.1 SC; 71/11, 23, 71/24, 15; 435/243
See application file for complete search history.

(56) References Cited

U.S. PATENT DOCUMENTS

| | | | |
|---|---|---|---|
| 4,050,917 A | | 9/1977 | Varro |
| 4,067,716 A | * | 1/1978 | Sterrett ........................... 71/24 |
| 4,168,962 A | | 9/1979 | Lambeth |
| 4,229,442 A | | 10/1980 | Pinkard |
| 4,767,440 A | * | 8/1988 | Salac ............................ 71/23 |
| 4,900,348 A | | 2/1990 | Hoitink |
| 5,009,605 A | * | 4/1991 | Crumly et al. ................ 439/67 |
| 5,501,718 A | | 3/1996 | Bandurski |
| 5,656,486 A | | 8/1997 | Daniels |
| 5,738,703 A | | 4/1998 | Bandurski |
| 6,293,045 B1 | | 9/2001 | Morgan |
| 6,455,149 B1 | | 9/2002 | Hagen et al. |

FOREIGN PATENT DOCUMENTS

JP 63084423 A * 4/1988

OTHER PUBLICATIONS

Yardener; Published on Internet on Aug. 23, 2003 http://www.yardner.com/compostinthegarden.html.
Gardenline; Published on Internet on Oct. 27, 2003 http://gardenline.usask.ca/misc/seeds2.html.
Growgear; Published on Internet on Aug. 2, 2003 http://www.growgear.com/ggear_university102.htm.

* cited by examiner

*Primary Examiner*—T. Nguyen
(74) *Attorney, Agent, or Firm*—www.bobharter.com; Robert J. Harter

(57) ABSTRACT

A horticulture growing medium mixture or so-called "potting soil" provides a generally soil-less medium that does not rely on the use of peat moss, soil or compost. A unique combination of anaerobically digested solids, perlite, vermiculite, and various additives and amendments provides a growing medium with a surprisingly high acid-buffering coefficient. Although the growing medium is particularly suited for orchids, the medium can be tailor-mixed for various other plants as well.

5 Claims, 3 Drawing Sheets

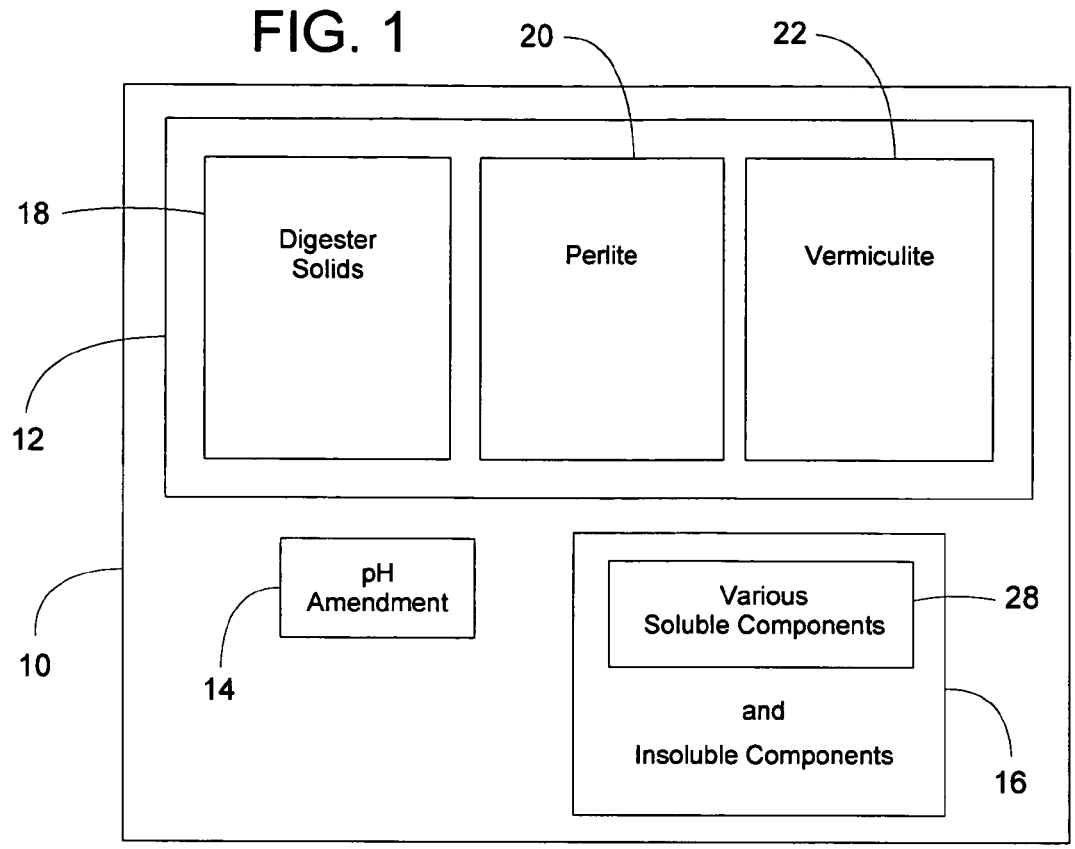
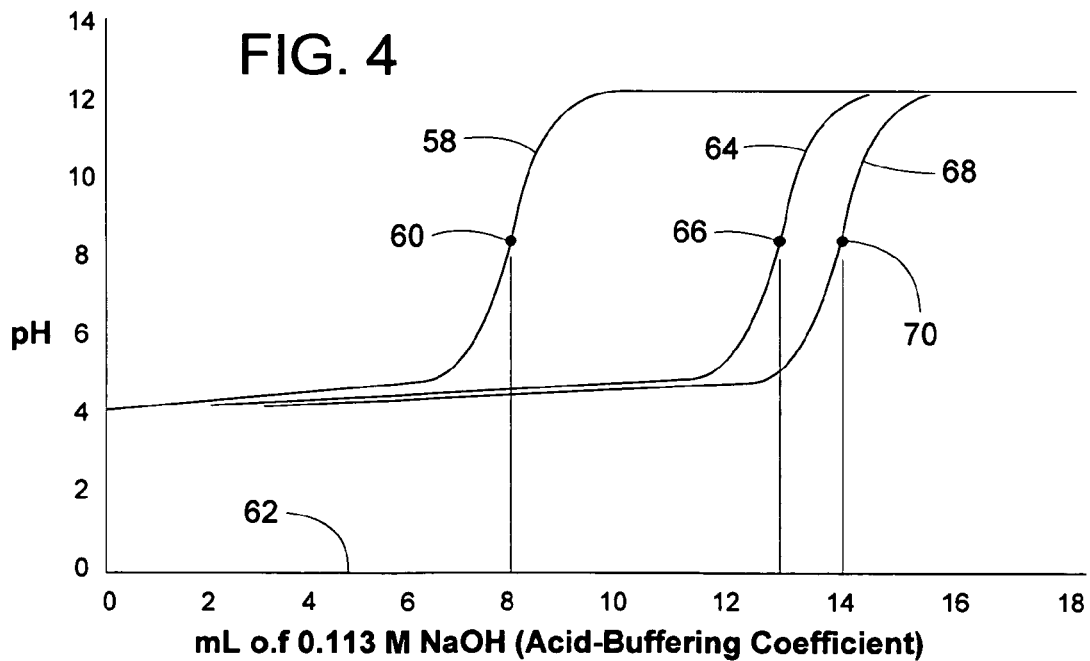

FIG. 2

| Component | Mix - A | Mix - B | Mix - C | Mix - D |
|---|---|---|---|---|
| Digester Solids. (% vol.) | 50 | 33 | 16.5 | 40 |
| Coir (% vol.) | - | - | 16.5 | - |
| Vermiculite (% vol.) | 25 | 33 | 33 | 30 |
| Perlite (% vol.) | 25 | 33 | 33 | 30 |
| pH | 7 - 7.3 | 8.7 | 7.7 | 6.4 |
| Nitrate (ppm) | 350 - 457 | 18 | 94 | 65 |
| P (ppm) | 63 - 79 | 2 | 33 | 39 |
| K (ppm) | 444 - 908 | 108 | 218 | 180 |
| Ca (ppm) | 375 - 547 | 84 | 228 | 134 |
| Mg (ppm) | 352 - 450 | 91 | 222 | 148 |
| Salts (ppm) | 450 - 600 | 134 | 3960 | 148 |
| S (ppm) | 492 - 965 | 13 | 322 | 117 |
| Zn (ppm) | 16.6 - 23 | 0.5 | 3.0 | 2.5 |
| B (ppm) | 2.9 - 5.1 | 0.02 | 0.26 | 0.12 |
| Mn (ppm) | 32 - 42 | 1.4 | 3.9 | 3.8 |
| Fe (ppm) | 3.8 - 9.2 | 1.4 | 1.7 | 3.4 |
| Cu (ppm) | 11 - 21 | 0.17 | 2.1 | 1.6 |

US 7,726,069 B1

HORTICULTURE GROWING MEDIA

CROSS-REFERENCE TO RELATED APPLICATION

This application claims the benefit of provisional patent application Ser. No. 60/711,725 filed on Aug. 26, 2005 by present inventors.

BACKGROUND OF THE INVENTION

1. Field of the Invention

The subject invention generally pertains to potting soils and more specifically an alternative growing medium.

2. Description of Related Art

A wide variety of potting soils and other growing media have been developed for supporting the growth of potted plants. Perhaps the most common are mixtures having a base of sphagnum moss peat, soil, ground coconut coir, composted hardwood bark, or composted manure (aerobically reduced manure or crop byproducts). Current potting soils, however, have various drawbacks.

Harvesting peat from wetland bogs is becoming expensive and is raising environmental concerns. Compost and other base materials often have one or more disadvantages such as high shipping costs, poor nutrient holding capacity, unpleasant odor, or unsuitable water retention. Moreover, some potting mixes have a pH that is unsuitable for certain plants.

Thus, there is a need for a better plant growing medium that overcomes the drawbacks of existing potting mixes.

SUMMARY OF THE INVENTION

An object of the invention is to provide a growing medium for plants that uses anaerobically digested solids instead of peat or compost.

Another object of some embodiments is to provide a growing medium that avoids the environmental problems and high cost of alternatives that rely on composted materials or peat moss.

Another object of some embodiments is to provide a growing medium that has a relatively high acid-buffering capacity.

Another object of some embodiments is to provide a horticulture growing medium that is preferably a substantially dry mixture whose sulfur content is controlled so as to provide a growing medium that is nearly odorless, lightweight, easy to package in an airtight bag, easy to handle, and easy to ship.

Another object of some embodiments is to provide a growing medium having a base of anaerobically digested solids so as to provide a mixture whose pH can be lowered by aluminum sulfate, iron sulfate, or some other pH amendment to a level that is suitable for plant growth.

Another object of some embodiments is to provide a growing medium that is suitable for growing orchids without having to rely on peat moss, coconut coir or other alternatives.

Another object of some embodiments is to create a growing medium with anaerobically digested solids yet still have desirable amount of humic acid.

Another object of some embodiments is to provide a growing medium whose pH can be adjusted with a reasonable amount of a pH amendment.

Another object of some embodiments is to provide a growing medium for orchids by adding coconut coir and excluding peat moss.

Another object of some embodiments is to provide a growing medium for bedding plants, cut flowers, nursery plants and other plant species grown in containers by adding coconut coir or other suitable organic constituent and excluding peat moss.

Another object of some embodiments is to provide a mixture of soluble components each of a particular concentration to create a growing medium that is suitable for geraniums, wherein the components include, but are not limited to, nitrate, phosphorous, potassium, calcium, magnesium, sulfur, zinc, boron, manganese, and copper.

Another object of some embodiments is to provide a mixture of soluble components each of a particular concentration to create a growing medium that is suitable for container-grown plants, wherein the components include, but are not limited to, nitrate, phosphorous, potassium, calcium, magnesium, sulfur, zinc, boron, manganese, and copper.

Another object of some embodiments is to provide a mixture of soluble components each of a particular concentration to create a growing medium that is suitable for orchids, wherein the components include, but are not limited to, nitrate, potassium, calcium, magnesium, and sulfur.

One or more of these and/or other objects of the invention are provided by a submixture of digester solids, vermiculite and perlite, plus amendments to make the submixture particularly suitable for certain plants.

BRIEF DESCRIPTION OF THE DRAWING

FIG. 1 is a schematic diagram illustrating a horticulture growing medium according to the subject invention.

FIG. 2 is chart showing recipes of various horticulture growing media mixes.

FIG. 4 is a graph illustrating the acid-buffering characteristic of various materials.

DESCRIPTION OF THE PREFERRED EMBODIMENT

Figure 3:
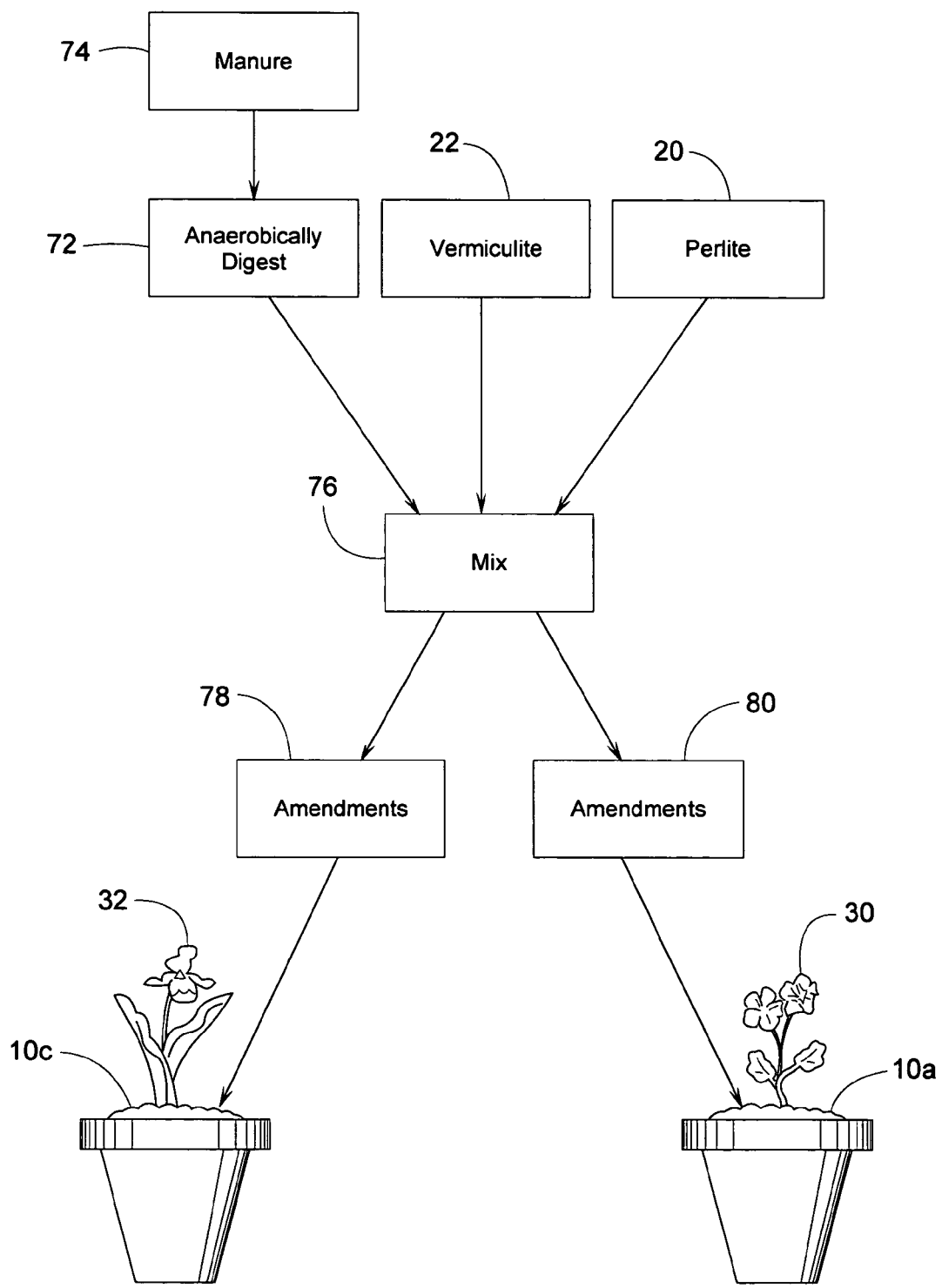
FIG. 3 is a block diagram showing how growing media can be produced and used.

Referring to FIG. 1, a horticulture growing medium 10 comprises a submixture 12 that may include a pH amendment 14 and various other components 16. Submixture 12 comprises an organic component 18, perlite 20 and vermiculite 22 in various concentrations. In currently preferred embodiments, organic component 18 is primarily comprised of substantially anaerobically digested manure (as opposed to conventional aerobically decomposed compost or peat moss), however, it is conceivable that organic component 18 could include coconut coir 24, peat moss, composted bark, and other organic substances.

A pH amendment 14 can be added to submixture 12 to provide medium 10 with a pH (reference numeral 26 of FIG. 2) that is appropriate for certain plants. Medium 10 may include various soluble components 28 in various concentrations to provide medium 10 with qualities that are beneficial to plants. Soluble components 28 may be added to submixture 12 and/or they may exist as natural or pre-existing ingredients of organic components 18, perlite 20 and/or vermiculite 22. Moreover, pH amendment 14 may actually be one of the soluble components 28. Aluminum sulfate or iron sulfate, for instance, may be part of the soluble components 28 and may also serve as pH amendment 14. Flowers of sulfur (sulfur) may be substituted for aluminum or iron sulfate but would be considered insoluble without suitable micro-organisms to promote its decomposition. In all, growing medium 10 can provide a generally soil-free mixture without having to rely on a significant amount of peat moss, compost or soil and preferably no peat moss, no compost and no soil whatsoever.

Various examples of growing medium 10 are illustrated in FIG. 2, and the examples are labeled Mix-A 10a, Mix-B 10b, Mix-C 10c, and Mix-D 10d. Mix-A 10a was originally intended for growing geraniums 30 (FIG. 3) and other bedding plants; and Mix-B 10b, Mix-C 10c, and Mix-D 10d were designed for Cypripedium and other basophilic orchids 32 (FIG. 3). It should be noted, however, that the various mixes A-D are exemplary embodiments and that their specified mixtures and uses may vary. Moreover, the tabulated values of FIG. 2 are target values, and the actual values could deviate from those listed and still provide beneficial results. For the soluble components 28 (those measured in ppm), their values could vary by plus or minus 20% and still provide beneficial results. The listed values in ppm (parts per million) for the soluble components are measured by an appropriate conventional method using standard greenhouse filters and standard potting media tests that are well known to those of ordinary skill in the art. Although FIG. 2 suggest specific proportions of organic component 18, vermiculite 22, perlite 20 and coir 24, the actual range of those proportions could vary greatly and still remain well within the scope of the invention. Organic component 18 (in the form of anaerobically digested solids with or without coir 24) could actually make up 5% to 75% of the volume of growing medium 10, vermiculite 22 could make up 0% to 50% of the volume of medium 10, and perlite 20 could make up 0% to 50% of the volume of medium 10 and still provide beneficial results.

Perlite 20 provides medium 10 with water drainage and aeration. Vermiculite 22 may do this also; however, vermiculite 22 also has a slightly negative charge and some porosity, which can help hold moisture and positively charged nutrients. In some embodiments, it is conceivable to replace the perlite or vermiculite with alternatives such as polystyrene or sand. Moreover, a mixture of perlite and vermiculite could conceivably be replaced with perlite alone or vermiculite alone.

The soluble components 28 have been chosen to provide various benefits of which some have been identified as follows: nitrate 34 for chlorophyll and organic plant molecules containing nitrogen; phosphorous 36 for energy reactions and DNA bonding; potassium 38 for water regulation and movement; calcium 40 for cell membrane cell wall biosynthesis and associated electric charges, and cell division; magnesium 42 for enzyme regulation, respiratory passageway, and chlorophyll biosynthesis; salts 44 include soluble salts such as those containing sulfur, magnesium or other inorganic macro- or micro-nutrients; sulfur 46 for amino acids containing sulfur; zinc 48 for auxin production; boron 50 helps develop shoot tip growing point; manganese 52 regulates enzymes in respiration and moves electrons in photosynthesis; iron 54 regulates enzymes in respiration, moves electrons in photosynthesis, and activates enzymes for producing chlorophyll; and copper 56 moves electrons in photosynthesis.

In addition to the components shown in FIG. 2, organic component 18 is preferably comprised of anaerobically digested solids with 0.4% to 6% by weight of humic acid for positive results, and it is notably beneficial to have between 4% and 6% by weight of humic acid. When organic component 18 includes some coconut coir, as is the case with Mix-C 10c, such a mix may be particularly suitable for growing orchids 32.

A unique and valuable quality of growing medium 10 is its organic component's acid-buffering capacity or its ability to resist a decrease in its pH level as an acidic solution is added to organic component 10. An organic component's acid-buffering capacity can be quantified as an acid-buffering coefficient (see FIG. 4), which can be determined by performing a Zauche test on a sample of organic component 18.

A Zauche test involves taking a 500-mg. dry weight sample of organic component 18, and soaking it in 20 mL of 0.0993 M acidic acid for one hour. While the solution or suspension is soaking, it is stirred with a magnetic stir-bar. Upon completion of the one-hour soaking period, the suspension is vacuum filtered through a Whatman #1 filter paper. The remaining solids collected by the filter are rinsed with 160 mL of de-ionized water. The rinse water is combined with the filtrate and is then titrated with 0.133 M sodium hydroxide while measuring the rinse water's pH. The pH is plotted as a function of the quantity of the sodium hydroxide, as shown in FIG. 4. Curve 58 represents a Zauche test performed on a sample of anaerobically digested solids, which comprise the organic component of Mix-A 10a, Mix-B 10b, and Mix D 10d. The greatest slope of curve 58 is identified as point 60, which corresponds to 8 mL or an acid-buffering coefficient of 8 on an X-axis 62 of FIG. 4. Thus, organic component 18 (e.g., anaerobically digested manure) has an acid-buffering coefficient of 8. Curve 64 represents a Zauche test performed on conventional compost (e.g., aerobically decomposed manure). The steepest point of curve 64 is at point 66, which indicates that the compost sample has an acid-buffering coefficient of 13. Curve 68 represents a Zauche test performed on a sample of peat moss. The steepest point of curve 68 is at point 70, which indicates that the peat sample has an acid-buffering coefficient of 14. This means that the digester solids were able to neutralize 0.922 millimoles of acid compared to 0.196 millimoles for composted manure and 0.124 millimoles for peat moss. Or the composted manure and peat moss can neutralize approximately 15 to 20% of the acid that the digester solids can on a per gram basis of material. That is, the Zauche test will show that the growing medium can neutralize at least 0.400 millimoles of acid per gram of organic component which is twice the amount neutralized by composted manure or peat moss.

The acid-buffering effect of organic component 18 can be observed in growing medium 10. It has been found, for instance, that upon adding 200 grams of aluminum sulfate to a 2.5 cubic-foot sample of a growing medium, similar to Mix-A 10a but with 60% by volume of organic component instead of 50% (and 20% vermiculite and 20% perlite), the pH of the 2.5 cubic-foot sample would decrease less than 1.7 pH units. And the 1.7 pH figure would decrease proportionately more with a corresponding decrease of the volume percentage of the organic component. A mix with 30% organic component, for example, would decrease more than 1.7 pH units as it would have less buffering capacity and would change more.

When organic component 18 consists of anaerobically digested manure, it has been found that the pH of submixture 12 is approximately 8 pH units or at least greater than 7 pH units. Since this is too basic for many plants, a small quantity (e.g., less than 5% by weight) of a pH amendment such as aluminum sulfate, iron sulfate, or other inorganic or organic acidification agent can be added to submixture 12 to reduce the pH of growing medium 10 to a more desirable level such as 5.5 to 8.5 pH units, or perhaps 5 to 7.5. For orchids 32, a target pH may be approximately 7 or 7.5. For geraniums and other plants, a more appropriate target pH may be around 7 to 7.3 or perhaps even less than that, such as 5 to 6.5. In currently preferred embodiments, submixture 12 has an initial soluble sulfur content of less than 150 ppm, and after adding pH amendment 14 and/or soluble components 28, growing medium 10 has a final soluble sulfur content of around 100 to 800 ppm. In certain cases, pH amendment 14 may be a soluble lime to increase the mixture's pH level.

A method of creating and using growing medium 10 is illustrated in FIG. 3. A block 72 represents the step of anaerobically digesting manure 74 to create organic component 18. Anaerobically digesting manure has been practiced for years for the purpose of disposing of farm animal and crop waste and for creating useful byproducts such as fertilizer and methane gas. The actual method of anaerobically digesting animal manure 74 can take many forms, all of which are well known by those of ordinary skill in the art. Block 76 represents the creation of submixture 12 by mixing vermiculite 22, perlite 20, and organic components 18 (e.g., digester solids) generated in block 72. Submixture 12 may already inherently include some or all of soluble components 28.

Submixture 12 from block 76 represents a basic mix or foundation that can be later modified for specific uses, such as, for example, growing orchids 32, geraniums 30, geraniums, begonia, petunia, impatiens, phlox paniculata, etc. Blocks 78 and 80 represent the steps of modifying submixture 12 to create, for example, medium Mix-C 10c for orchids 32 or medium Mix-A 10a for geraniums 30. The amendments of blocks 78 and 80 may include, but are not limited to, aluminum sulfate, iron sulfate, hydrated lime, fertilizer, OSMOCOTE-PLUS, coconut coir, peat moss, magnesium sulfate, MICROMAX, phosphates, potassium nitrate, calcium nitrate, etc.

Growing medium 10 is preferably a substantially dry mixture whose sulfur content is controlled so as to provide a growing medium that is nearly odorless, lightweight, easy to package in an airtight bag (low vapor pressure), easy to handle, and easy to ship.

Although the invention is described with reference to a preferred embodiment, it should be appreciated by those of ordinary skill in the art that various modifications are well within the scope of the invention. The scope of the invention, therefore, is to be determined by reference to the following claims.

The invention claimed is:

1. A horticulture growing medium, comprising:
    a vermiculite component, wherein the horticulture growing medium includes 1% to 50% by volume of the vermiculite component;
    a perlite component, wherein the horticulture growing medium includes 1% to 50% by volume of the perlite component;
    a soluble sulfur component of 100 to 800 ppm; and an anaerobically digested manure with a humic acid component of 0.4 to 6% by weight, wherein the horticulture growing medium includes 10% to 75% by volume of the anaerobically digested manure, and the vermiculite component, the perlite component, and the anaerobically digested manure provides a submixture that has an initial pH and has a sufficient buffering capacity such that if 200 grams of aluminum sulfate were to be added to a 2.5 cubic-foot sample of the submixture, the initial pH of the 2.5 cubic-foot sample would decrease less than 2.8 pH units.

2. The horticulture growing medium of claim 1, further comprising a pH amendment that provides the horticulture growing medium with a final pH less than the initial pH.

3. The horticulture growing medium of claim 1, further comprising a humic acid component, wherein the organic component includes 0.4% to 6% by weight of the humic acid component.

4. The horticulture growing medium of claim 1, further comprising:
    280 to 548 ppm of a soluble nitrate component;
    50 to 95 ppm of a soluble phosphorous component;
    355 to 1090 ppm of a soluble potassium component;
    300 to 656 ppm of a soluble calcium component;
    282 to 540 ppm of soluble magnesium component;
    394 to 1158 ppm of a soluble sulfur component;
    13 to 28 ppm of a soluble zinc component
    2.3 to 6.1 ppm of a soluble boron component;
    26 to 50 ppm of a soluble manganese component; and
    8.8 to 25 ppm of a soluble copper component.

5. The horticulture growing medium of claim 1, further comprising:
    14 to 113 ppm of a soluble nitrate component;
    86 to 262 ppm of a soluble potassium component;
    67 to 274 ppm of a soluble calcium component;
    73 to 266 ppm of soluble magnesium component; and
    10 to 386 ppm of a soluble sulfur component.

* * * * *